July 6, 1943.                A. H. RZEPPA                2,323,569
                    SEALING MEANS FOR UNIVERSAL JOINTS
                            Filed Oct. 30, 1939
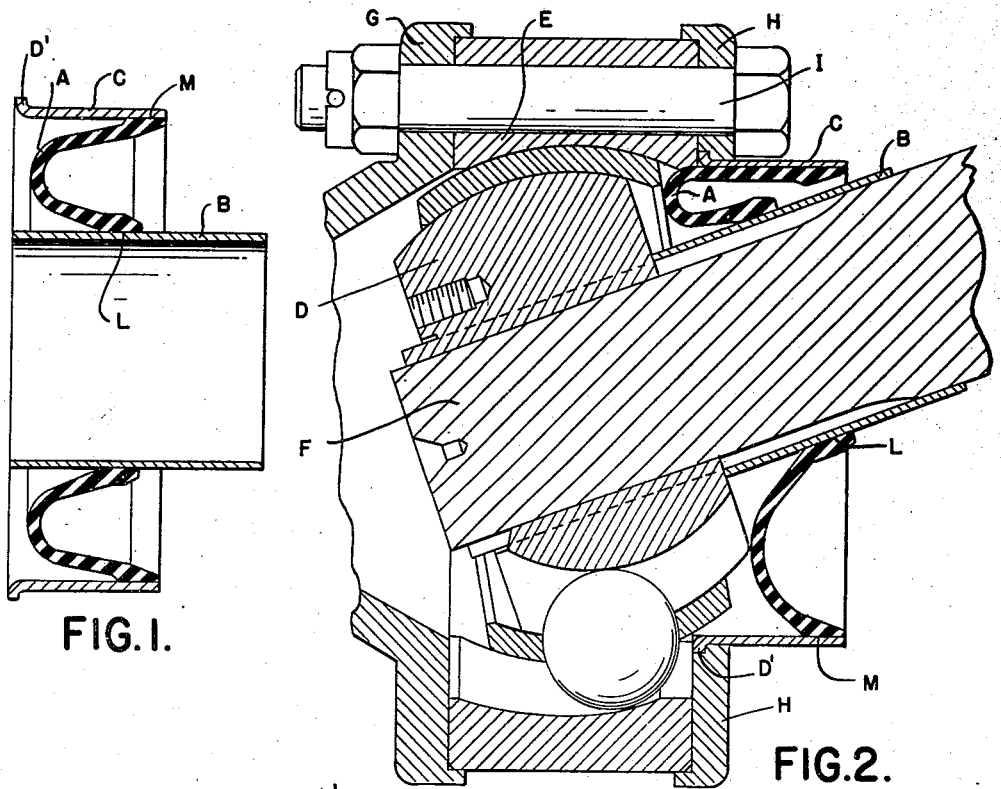
FIG. 1.
FIG. 2.
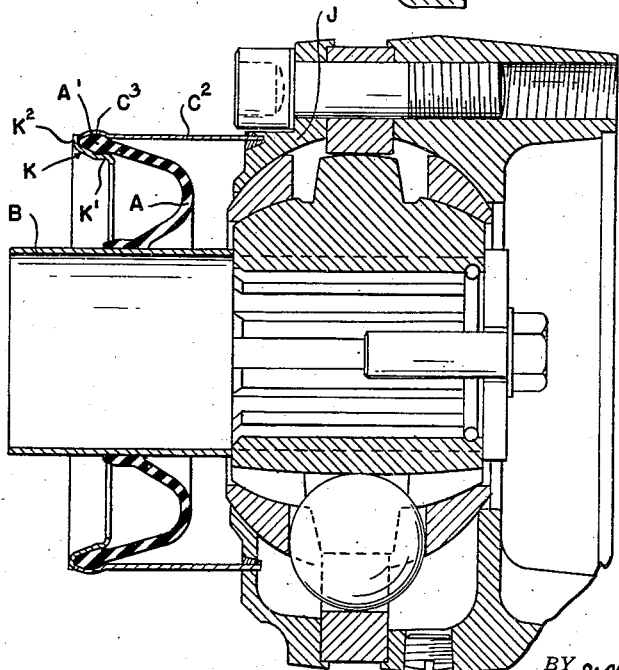
FIG. 3.
INVENTOR.
ALFRED H. RZEPPA
BY *Whittemore Hulbert & Belknap*
ATTORNEYS Patented July 6, 1943

2,323,569

UNITED STATES PATENT OFFICE 2,323,569

SEALING MEANS FOR UNIVERSAL JOINTS

Alfred H. Rzeppa, Grosse Pointe, Mich.

Application October 30, 1939, Serial No. 302,045

3 Claims. (Cl. 64—32)

The invention relates to sealing means applicable to universal joints and similar structures for the purpose of protecting the same from the ingress of dirt and the escape of lubricant. It is the object of the invention to obtain a construction which while forming an effective seal between relatively oscillating or gyrating members, accomplishes this with a minimum of stress in the material of which it is composed. To this end the invention consists in the construction as hereinafter set forth.

In the drawing:

Figure 1 is a central longitudinal section through my improved construction of sealing means;

Figure 2 is a similar view showing the sealing means as applied to a universal joint, the cooperating members of which are in angular relation to each other;

Figure 3 is a similar view illustrating a modified construction as applied to a different universal joint.

My improved sealing means consists essentially of an annulus formed of flexible impervious material having inner and outer spaced annular portions connected by an axially extended return bend portion. I preferably form this structure of rubber of a type which is not injured by oil, but any other material having the required flexibility, resilience and resistance may be substituted therefor. This annulus A is attached to the relatively oscillating cooperative members of the universal joint or other structure, preferably through the medium of an inner sleeve B and an outer annular casing C, these members being vulcanized or otherwise secured respectively to the inner and outer annular portions. As shown in Figure 2, the universal joint has the inner and outer spherically engaged members D and E, the inner member D engaging a shaft F and the outer member E being clamped between members G and H by bolts I. With such construction the sealing means is applied by placing the sleeve B around the shaft F and inserting the casing C through an aperture in the plate H from the inner side thereof prior to the clamping of this plate to the members E and G. An annular shoulder D' on the member C engaging an annular recess in the plate H serves to hold these members together.

With the modified construction of joint shown in Figure 3, it would be impossible to mount the member C as just described. Consequently, an annular member $C^2$ is attached to an outer member J of the joint by placing its inner end in an annular groove in said member J and securing the same by solder or other suitable means. The member A is attached to the sleeve B as before described, but is detachably secured to the member $C^2$. The attachment means comprises a bead A' on the member A for engaging a groove $C^3$ in the member $C^2$. Also, a cap member K is provided, said member having an inwardly extending flange K' fashioned for snap engagement with the bead A' and a radially outwardly extending flange $K^2$ for abutting against the end of the member $C^2$.

In mounting the sealing means on the universal joint in both constructions above described, the convex face of the return bend in the member A is arranged to face the center of oscillation of the joint. This has the effect of minimizing the distortion of the member A, due to the oscillation of the joint. Thus as shown in Figure 2, the angular position of the shaft F moves the sleeve B adjacent to one side of the annular casing C. This swings the end of the return bend which is attached to the sleeve on the same side, axially inward with respect to the member C, while on the opposite side the end of the return bend attached to the sleeve is moved axially outward. Consequently, there is less distortion than would be the case if the convex side of the annulus faced outward instead of inward. Distortion is further minimized by forming the zone of attachment L of the member A to the sleeve B so as to be slightly axially inward of the zone of attachment M of said member to the casing C, when said casing and said sleeve are in concentric relation to each other.

In operation, the gyrations of the shaft F, due to angular adjustment of the axis thereof with respect to the axis of the cooperating member, will merely produce a similar gyration of the portion of the member A which is attached to the sleeve B. The depth of the return bend is sufficient so that in all positions of the sleeve B the radial length of the cross section is greater than the displacement from the casing C. The diameter of the casing C is preferably less than the internal diameter of the member E so that under centrifugal action any lubricant that may be within the casing C, will be thrown outward into the member E.

What I claim as my invention is:

1. A sealing means for universal joints comprising a member formed of flexible impervious material having spaced inner and outer annular portions with an intermediate axially extended return bend portion, a sleeve attached to the inner annular portion for engaging one of the cooperating members of the universal joint, an annular cylindrical member secured to the other member of the universal joint in concentric relation to said sleeve when said joint members are in axial alignment, and a detachable connection between the outer annular portion of said flexible member and said annular member, said connection comprising a bead on said flexible member for engaging a groove in said annular member and a cap member having an inwardly extending flange forming a snap engagement with said bead and a radially outwardly extending flange abutting against said annular member.

2. A sealing unit attachable to universal joints on one side of the center of oscillation thereof, said joints each having an outer member, said unit comprising outer and inner concentrically arranged spaced substantially cylindrical rigid members, a flexible annular member of rubber having a tapering return bent cross section arranged between said outer and inner rigid annular members with its end portions vulcanized to said members, and means for attaching said unit to the universal joint with the inner annular member sleeved on the shaft and the outer annular member secured to the outer member of the joint and constituting a stop for limiting the outward movement of said flexible member under centrifugal action.

3. The combination with a universal joint of the type comprising spherically engaged inner and outer members and a shaft extending axially from said inner member, of a sealing means comprising outer and inner rigid cylindrical members surrounding said shaft at one side of the center of said joint, the inner cylindrical member being sleeved thereon and the outer cylindrical member being attached to the outer member of said joint, and a flexible member between said outer and inner cylindrical members being of return bend cross section, its outer and inner edge portions being attached respectively to said outer and inner cylindrical members and the return bend portion extending axially toward the center of oscillation adjacent to the inner member of said joint, whereby said flexible member is retained completely within said outer cylindrical member during all angular movements of the joint and said outer cylindrical member limits the radial outward movement of said flexible member under centrifugal action.

ALFRED H. RZEPPA.